G. W. SMITH.
JAW TRAP.
APPLICATION FILED APR. 20, 1918.
1,349,697.
Patented Aug. 17, 1920.
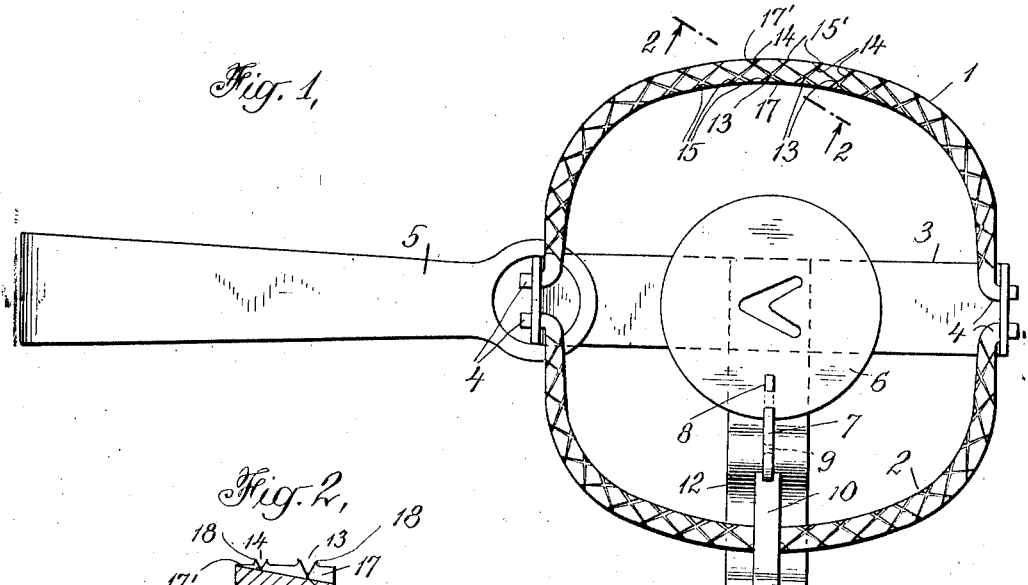
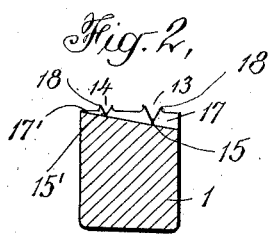
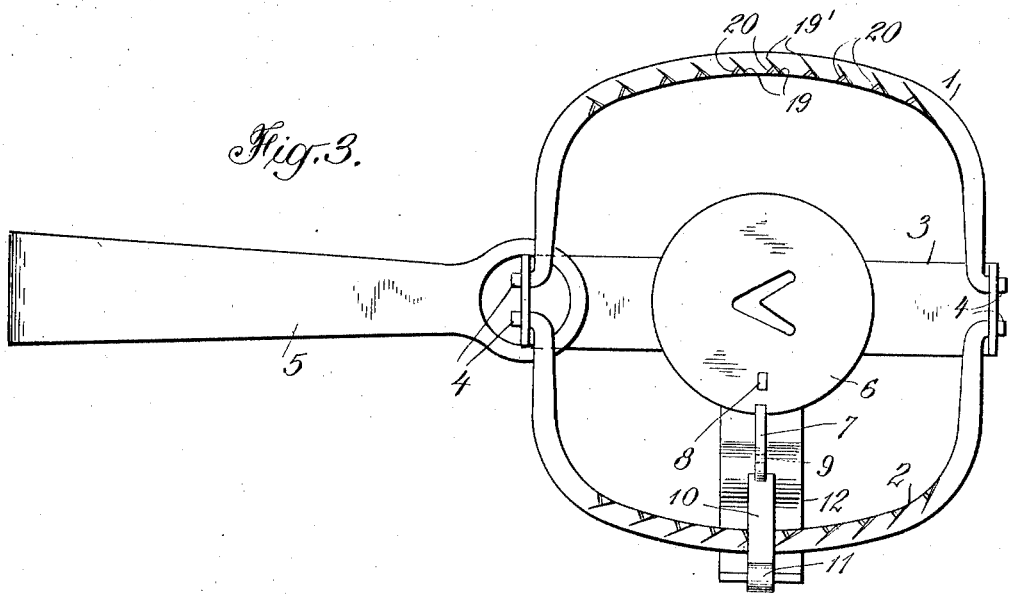
Inventor
Gerard Wayland Smith
By his Attorney
Harry L. Duncan

UNITED STATES PATENT OFFICE.

GERARD WAYLAND SMITH, OF ONEIDA, NEW YORK, ASSIGNOR TO ONEIDA COMMUNITY, LIMITED, OF ONEIDA, NEW YORK, A CORPORATION OF NEW YORK.

JAW-TRAP.

1,349,697.      Specification of Letters Patent.      Patented Aug. 17, 1920.

Application filed April 20, 1918. Serial No. 229,712.

*To all whom it may concern:*

Be it known that I, GERARD WAYLAND SMITH, a citizen of the United States, and resident of Oneida, Madison county, State of New York, have made a certain new and useful Invention Relating to Jaw-Traps, of which the following is a specification, taken in connection with the accompanying drawing, which forms part of the same.

This invention relates especially to jaw traps in which the coöperating or meeting faces of the trap jaws are sufficiently wide to give a good grip and are preferably substantially flat and are given greatly increased gripping holding action by forming thereon gripping corrugations, such as any suitable form or arrangement of grooves or projections to minimize or prevent the animal working its leg or other part along the jaw faces. These gripping corrugations may comprise a check pattern of sharp gripping corrugations or grooves which may be somewhat deeper at the inner sides of the jaws and in some cases it is desirable to form sharp projections adjacent the sides of these corrugations to still more securely grip and hold an animal.

In the accompanying drawing showing in a somewhat diagrammatic way several illustrative embodiments of this invention, Figure 1 shows in plan a trap in open or set position.

Fig. 2 is an enlarged section through one of the trap jaws taken substantially along the line 2—2 of Fig. 1; and Fig. 3 is a plan view of another form of trap shown in set position.

The trap may have any suitable or usual construction and may, for example, comprise the frame 3 formed with upstanding lugs or bearing portions to which are loosely pivoted the pivotal ends or gudgeons 4 of the trap jaws 1, 2. One or more springs 5 may coöperate with these jaws so as to normally tend to close them together. A trigger support 12 may be secured to the frame 3 and having an upstanding portion formed with the trigger pivot 11 about which the trigger 10 is loosely pivoted so as to be extended over one of the trap jaws, for instance, and be engaged or interlocked with the pan lever 7. This pan lever may be pivoted about the portion 9 of the trigger support 12 and may be secured to the trap pan 6 as by the rivet connection 8.

The trap jaws 1, 2 which may be formed of malleable iron or wrought iron or steel or other suitable material preferably have quite wide substantially flat coöperating faces so as to securely grip and hold the leg or other part of the animal without cutting through or severing the same. In order to more securely hold the leg or other part of the animal engaged by the jaws and prevent its being worked loose, the jaw faces are formed or provided with gripping corrugations or grooves which may as indicated in Fig. 1 be in the form of a check pattern of grooves or gripping corrugations which for some purposes may advantageously be somewhat deeper adjacent the inner sides of the jaws. These gripping grooves may be conveniently and advantageously formed of substantially V-section as shown more in detail in Fig. 2 and the grooves such as 17, may be considerably deeper adjacent the inner side of the jaw toward the pan than at the outer side of the jaw where the groove 17' may practically disappear, as indicated. The coöperating or crossing holding grooves 15 may be of similar form and their inner ends may be deeper than their outer ends 15' and of course these crossing grooves form intersections or crossing points 13, 14 which still further minimize the chance of the animal working its leg or other part along either set of these crossing grooves. For some purposes also it is desirable to have these gripping corrugations or grooves provided with projecting burs, points or ridges, such as 18, which project somewhat beyond the normal jaw face adjacent the groove and reinforce this gripping holding action. This may be done in various ways as for instance by rolling or stamping the holding corrugations in the jaw faces when the jaws are made of wrought metal and when relatively sharp dies are used to form the grooves these holding projections or burs may be conveniently thrown out upon each side as indicated.

Fig. 3 shows another form of holding corrugations or grooves in the trap jaws, one set of the meeting grooves 19 being in this case longer than the angularly disposed grooves 20, and if desired, these grooves may be relatively deeper adjacent the inner sides of the jaw faces so that they may end at about the points 19' before they go entirely across the jaw face. It is as indicated in Fig. 3 unnecessary in all cases to have the gripping corrugations extend entirely around the trap jaws and they are of course most desirable adjacent the middle parts of the jaws somewhat away from the pivot thereof.

This invention has been described in connection with a number of illustrative embodiments, forms, proportions, materials, arrangements, designs and sizes of parts, and materials and methods of manufacture, to the details of which disclosure the invention is not of course to be limited, since what is claimed as new and what is desired to be secured by Letters Patent is set forth in the appended claims:

1. In jaw traps, a frame, jaws loosely pivoted to said frame, a spring coöperating with said jaws and normally tending to force their coöperating faces toward each other, said coöperating jaw faces being wide and substantially flat and formed with gripping corrugations comprising a check pattern of intersecting gripping V-sectioned grooves which are deeper adjacent the inner sides of said jaws, substantially sharp projecting ridges being formed in said jaw faces adjacent said gripping grooves.

2. In jaw traps, a frame and coöperating spring closed trap jaws, the coöperating animal holding faces of said trap jaws being wide and formed with gripping corrugations comprising gripping grooves which are deeper adjacent the inner side of said jaws and substantially integral projecting members formed in said jaw faces adjacent said gripping grooves.

3. In jaw traps, coöperating spring closed trap jaws, the coöperating animal holding faces of said trap jaws being formed with gripping corrugations comprising grooves and adjacent integral projecting members formed in said jaw faces.

GERARD WAYLAND SMITH.